United States Patent
Sano et al.

(10) Patent No.: US 11,473,646 B2
(45) Date of Patent: Oct. 18, 2022

(54) BUSHING AND VEHICLE SUSPENSION DEVICE

(71) Applicants: Mazda Motor Corporation, Hiroshima (JP); MOLTEN CORPORATION, Hiroshima (JP)

(72) Inventors: Susumu Sano, Kure (JP); Takahiko Shigyo, Hiroshima (JP); Hiroki Kimura, Hiroshima (JP); Masaya Hiramatsu, Hiroshima (JP); Haruaki Iseri, Hiroshima (JP); Kazuhiro Okuyama, Hiroshima (JP); Hiroyuki Okamoto, Bath (GB); Eiji Okada, Hiroshima (JP); Naoki Kurata, Fukuyama (JP); Hiromi Miwade, Hiroshima (JP); Tadashi Yoshimura, Hiroshima (JP); Ryo Ogawa, Hatsukaichi (JP); Tomohiro Tuji, Hiroshima (JP); Masayuki Mochizuki, Hiroshima (JP)

(73) Assignees: MAZDA MOTOR CORPORATION, Hiroshima (JP); MOLTEN CORPORATION, Hiroshima (JP)

(*) Notice: Subject to any disclaimer, the term of this patent is extended or adjusted under 35 U.S.C. 154(b) by 492 days.

(21) Appl. No.: 16/592,703

(22) Filed: Oct. 3, 2019

(65) Prior Publication Data

US 2020/0109760 A1 Apr. 9, 2020

(30) Foreign Application Priority Data

Oct. 4, 2018 (JP) ................ JP2018-189085

(51) Int. Cl.
*B60G 7/00* (2006.01)
*F16F 13/14* (2006.01)
*B60G 7/04* (2006.01)

(52) U.S. Cl.
CPC .............. *F16F 13/14* (2013.01); *B60G 7/008* (2013.01); *B60G 7/04* (2013.01)

(58) Field of Classification Search
CPC .. B60G 7/02; B60G 7/04; B60G 7/008; F16F 13/14
See application file for complete search history.

(56) References Cited

U.S. PATENT DOCUMENTS 3,030,132 A * 4/1962 Compton ................ F16F 1/393
403/226
4,129,394 A * 12/1978 Eichinger ............... F16F 1/393
403/120

(Continued)

FOREIGN PATENT DOCUMENTS

CN 104061264 A 9/2014
CN 105134850 A 12/2015

(Continued)

OTHER PUBLICATIONS

European Patent Office; Extended European Search Report for European Patent Application No. 19201011.4 dated Mar. 2, 2020.

(Continued)

*Primary Examiner* — Paul N Dickson
*Assistant Examiner* — Maxwell L Meshaka
(74) *Attorney, Agent, or Firm* — Parsons Behle & Latimer

(57) ABSTRACT

The bushing includes an outer cylinder, an inner cylinder, and an elastic body therebetween. The outer cylinder has a central recess portion formed in a curved shape. The inner cylinder has a central convex portion being formed in a curved shape. A distance between a vertex of the central recess portion and the vertex of the central convex portion is smaller than a distance between a point other than the vertex of the central recess portion and a point at which a straight line extending from the point other than the vertex (Continued)

of the central recess portion to an intersection point of the perpendicular line and the axis of the inner cylinder intersects the central convex portion.

14 Claims, 6 Drawing Sheets

(56) References Cited

U.S. PATENT DOCUMENTS

| | | | | |
|---|---|---|---|---|
| 5,887,859 A | * | 3/1999 | Hadano | F16F 1/3863 267/141.1 |
| 5,915,842 A | * | 6/1999 | Redinger | F16F 1/393 267/281 |
| 6,273,406 B1 | * | 8/2001 | Miyamoto | B60G 7/02 267/140.12 |
| 8,282,305 B2 | * | 10/2012 | Rechtien | F16C 23/046 403/135 |
| 9,475,358 B2 | * | 10/2016 | Grim | F16F 1/393 |
| 2002/0060385 A1 | * | 5/2002 | Mayerbock | F16F 13/14 267/293 |
| 2010/0127441 A1 | * | 5/2010 | Honneur | F16F 13/14 267/140.13 |
| 2012/0292872 A1 | | 11/2012 | Koide et al. | |
| 2013/0025087 A1 | * | 1/2013 | Jang | F16F 1/38 16/2.2 |
| 2015/0322998 A1 | * | 11/2015 | Lee | B60G 7/005 403/133 |
| 2019/0144106 A1 | * | 5/2019 | Riedl | F16F 1/393 384/536 |
| 2019/0226543 A1 | | 7/2019 | Niwa | |
| 2020/0108682 A1 | * | 4/2020 | Sano | F16F 1/3807 |
| 2021/0309066 A1 | * | 10/2021 | Nishimura | F16F 1/387 |
| 2021/0402838 A1 | * | 12/2021 | Matsumoto | B60G 7/02 |

FOREIGN PATENT DOCUMENTS

| | | |
|---|---|---|
| CN | 105972064 A | 9/2016 |
| DE | 3536283 A1 | 10/2006 |
| FR | 2562967 A1 | 10/1985 |
| FR | 2614000 A1 | 10/1988 |
| FR | 3045501 A1 | 6/2017 |
| JP | H03-012029 | 2/1991 |
| JP | H0312029 | 2/1991 |
| JP | H06106931 | 4/1994 |
| JP | 2008095861 A | 4/2008 |

OTHER PUBLICATIONS

Japanese Patent Office; Office Action for Japanese Patent Application No. 2018-189084 dated May 24, 2022.

* cited by examiner

Behavior with respect to the external force in the front-rear direction

Behavior with respect to the external force in the left-right direction a : Before drawing   b : After drawing a : Before drawing   b : After drawing a : Before drawing   b : Drawing process before forming   c : Drawing process after forming (can be omitted)

BUSHING AND VEHICLE SUSPENSION DEVICE

BACKGROUND OF THE INVENTION

The present disclosure relates to a bushing, in particular, a vibration isolating bushing, and a suspension device for a vehicle.

For example, a bushing for isolating vibration is known which is interposed in a mounting portion of various parts constituting a suspension of an automobile. The bushing has a function of vibration absorption and suspension positioning, and relatively low frequency vibration is absorbed by a large part such as a spring or a damper, whereas relatively high frequency vibration is absorbed by a small part such as a bushing.

The bushing includes an inner cylinder hollow in the axial direction and made of metal, an elastic body such as rubber fixed to the outer peripheral surface of the inner cylinder, and an outer cylinder made of metal fixed to the outer peripheral surface of the elastic body. The bushing is attached to the attachment portion by attaching one of the various parts to be vibration-proof-connected to the inner cylinder and attaching the other one of the various parts to be vibration-proof-connected to the outer cylinder (for example, refer to Patent Document 1). For the stopper function when inserted into the mounting hole of the other part, which is necessary at the occasion above, a technique is disclosed in which an end portion and a flange portion are provided by squeezing and molding an outer cylinder, and an elastic body (rubber) is provided around the flange portion, thereby exhibiting the stopper function.

However, in Patent Document 1, the inner side of the outer cylinder is formed in a broken line shape, the outer side of the inner cylinder is formed in a wave shape, and rubber is provided therebetween, and when a force acts in the axial direction of the inner cylinder in a state of being mounted in the mounting hole, there is a problem in durability of the elastic body and the bush because the wall thickness of the elastic body does not change smoothly. In addition, if the change in the wall thickness of the elastic body is not smooth, the performance of the suspension designed to define the behavior of the wheel with respect to various external forces input to the vehicle may not be sufficiently exhibited.

Patent document: J.H03-12029.U

SUMMARY OF THE INVENTION

The present disclosure has been made in view of the above-mentioned problems, and an object thereof is to provide a bushing having improved durability of an elastic body. It is another object of the present disclosure to provide a front suspension device having a bushing capable of giving regularity to the behavior during running of a vehicle and having high durability. In order to achieve the above object, the present disclosure can be understood from the following configurations.

(1) According to a first aspect of the present disclosure, a bushing having an outer cylinder, an inner cylinder and an elastic body provided between the outer cylinder and the inner cylinder, wherein: the outer cylinder has a cylindrical inner peripheral surface having constant radius formed concentrically with the axis of the inner cylinder or eccentrically with respect to the axis of the inner cylinder, and has a central recess portion recessed from the inner peripheral surface in a radial direction orthogonal to the direction of the axis at a central portion along the direction of the axis; the central recess portion is formed to have a curved shape or a combination of a curved shape and a straight shape in a cross-sectional view along the direction of the axis, wherein a vertex of the central recess portion farthest from the axis of the inner cylinder is located on the curved shape; the inner cylinder has a central convex portion that swells from the outer peripheral surface in a radial direction orthogonal to the direction of the axis at a position corresponding to the central recess portion of the central portion in the direction of the axis; the central convex portion is formed to have a curved shape or a combination of a curved shape and a straight shape in a cross-sectional view along the direction of the axis; and in the elastic body, in a cross-sectional view along the axial direction of the inner cylinder, a distance between a vertex of the central recess portion and a point at which a perpendicular line from the vertex of the central recess portion to an axis of the inner cylinder intersects the central convex portion is smaller than a distance between a point other than the vertex of the central recess portion and a point at which a straight line extending from the point other than the vertex of the central recess portion to an intersection point of the perpendicular line and the axis of the inner cylinder intersects the central convex portion.

(2) According to a second aspect of the present disclosure, a bushing having an outer cylinder, an inner cylinder and an elastic body provided between the outer cylinder and the inner cylinder, wherein: the outer cylinder has a cylindrical inner peripheral surface having constant radius formed concentrically with the axis of the inner cylinder or eccentrically with respect to the axis of the inner cylinder, and has a central recess portion recessed from the inner peripheral surface in a radial direction orthogonal to the direction of the axis at a central portion along the direction of the axis; the central recess portion is formed to have a curved shape or a combination of a curved shape and a straight shape in a cross-sectional view along the direction of the axis, wherein a vertex of the central recess portion farthest from the axis of the inner cylinder is located on the curved shape; the inner cylinder has a central convex portion that swells from the outer peripheral surface in a radial direction orthogonal to the direction of the axis at a position corresponding to the central recess portion of the central portion in the direction of the axis; the central convex portion is formed to have a curved shape or a combination of a curved shape and a straight shape in a cross-sectional view along the direction of the axis; the curve of the central recess portion is formed by an arc of a circle centered on the first position that deviates from the axis of the inner cylinder in the radial direction in a cross-sectional view along the axial direction of the inner cylinder; the curve of the central recess portion is formed by an arc of a circle centered on the first position that deviates from the axis of the inner cylinder in the radial direction in a cross-sectional view along the axial direction of the inner cylinder; and in the elastic body, in a cross-sectional view along the axial direction of the inner cylinder, a distance between a vertex of the central recess portion and the vertex of the central convex portion is smaller than a distance between a point other than the vertex of the central recess portion and a point at which a straight line extending from a point other than the vertex of the central recess portion to the first position which is the center of the arc of the central recess portion intersects the central convex portion.

(3) The bushing of (2) above, wherein a radius of the arc of the central convex portion is smaller than a radius of the arc of the central recess portion.

(4) The bushing according to any one of (1) to (3), wherein the outer cylinder has a cylindrical outer peripheral surface with a constant radius at a position corresponding to the central recess portion.

(5) The bushing according to any one of (1) to (4) above, wherein the thickness of both ends of the outer cylinder is greater than the thickness of the central portion thereof.

(6) The bushing according to any one of (1) to (5) above, wherein a maximum outer diameter of the central convex portion is larger than a minimum inner diameter of the inner peripheral surface of the outer cylinder.

(7) According to a third aspect of the present disclosure, a vehicle suspension device, having an arm member provided between a knuckle for rotatably supporting a wheel and a vehicle body for vertically displaceably positioning the wheel, and two bushings for swingably supporting the arm member with respect to the vehicle body and disposed apart from each other in the vehicle front-rear direction, wherein: one bushing of the two bushings includes an outer cylinder fixed to one of the vehicle body or the arm member, an inner cylinder fixed to the other of the vehicle body or the arm member, and an elastic body provided between the outer cylinder and the inner cylinder; the outer cylinder has a cylindrical inner peripheral surface having a constant radius formed concentrically with the axis of the inner cylinder or eccentrically with respect to the axis of the inner cylinder, and has a central recess portion recessed from the inner peripheral surface in a radial direction orthogonal to the direction of the axis at a central portion in the direction of the axis; in the cross-sectional view along the direction of the axis, the central recess portion is formed to have a curved shape or a combination of a curved shape and a straight shape, and a vertex of the inner cylinder farthest from the axis is located on the curved shape; the inner cylinder has a central convex portion which swells from the outer peripheral surface in a radial direction orthogonal to the direction of the axis at a position corresponding to the central recess portion of the central portion in the direction of the axis (x); in a cross-sectional view along the direction of the axis, the central convex portion is formed in a curved shape or a combination of a curved shape and a straight shape; in the elastic body, in a cross-sectional view along the axial direction of the inner cylinder, a distance between a vertex of the central recess portion and a point at which a perpendicular line from the vertex of the central recess portion to an axis of the inner cylinder intersects the central convex portion is smaller than a distance between a point other than the vertex of the central recess portion and a point at which a straight line extending from the point other than the vertex of the central recess portion to an intersection point of the perpendicular line and the axis of the inner cylinder intersects the central convex portion; and the other bushing of the two bushings is configured to allow rotation of the arm member about the one bushing caused by an external force applied to the wheel when the vehicle is running.

(8) According to a fourth aspect of the present disclosure, a vehicle suspension device, having an arm member provided between a knuckle for rotatably supporting a wheel and a vehicle body for vertically displaceably positioning the wheel, and two bushings for swingably supporting the arm member with respect to the vehicle body and disposed apart from each other in the vehicle front-rear direction, wherein: one bushing of the two bushings includes an outer cylinder fixed to one of the vehicle body or the arm member, an inner cylinder fixed to the other of the vehicle body or the arm member, and an elastic body provided between the outer cylinder and the inner cylinder; the outer cylinder has a cylindrical inner peripheral surface having a constant radius formed concentrically with the axis of the inner cylinder or eccentrically with respect to the axis of the inner cylinder, and has a central recess portion recessed from the inner peripheral surface in a radial direction orthogonal to the direction of the axis at a central portion in the direction of the axis; in the cross-sectional view along the direction of the axis, the central recess portion is formed to have a curved shape or a combination of a curved shape and a straight shape, and a vertex of the inner cylinder farthest from the axis is located on the curved shape; the inner cylinder has a central convex portion which swells from the outer peripheral surface in a radial direction orthogonal to the direction of the axis at a position corresponding to the central recess portion of the central portion in the direction of the axis; in a cross-sectional view along the direction of the axis, the central convex portion is formed in a curved shape or a combination of a curved shape and a straight shape; the curve of the central recess portion is formed by an arc of a circle centered on the first position that deviates from the axis of the inner cylinder in the radial direction in a cross-sectional view along the axial direction of the inner cylinder; the curve of the central recess portion is formed by an arc of a circle centered on the first position that deviates from the axis of the inner cylinder in the radial direction in a cross-sectional view along the axial direction of the inner cylinder; in the elastic body, in a cross-sectional view along the axial direction of the inner cylinder, a distance between a vertex of the central recess portion and the vertex of the central convex portion is smaller than a distance between a point other than the vertex of the central recess portion and a point at which a straight line extending from a point other than the vertex of the central recess portion to the first position which is the center of the arc of the central recess portion intersects the central convex portion; and the other bushing of the two bushings is configured to allow rotation of the arm member about the one bushing caused by an external force applied to the wheel when the vehicle is running.

Effect of the Invention: According to the present disclosure, since the central recess portion of the outer cylinder wraps the central convex portion of the inner cylinder with the elastic body interposed therebetween, the wrap structure of the outer cylinder over the inner cylinder can be realized, and since the central convex portion of the outer cylinder and the central convex portion of the inner cylinder are formed in an arc shape, it is possible to provide a bushing in which durability of the elastic body is improved against relative displacement such as relative rotational displacement of the inner cylinder and the outer cylinder with respect to various external forces applied to the bushing. In addition, it is possible to provide a front suspension device having a bushing which can impart regularity to the behavior during running of the vehicle and has high durability.

DETAILED DESCRIPTION OF THE INVENTION

Figure 1:
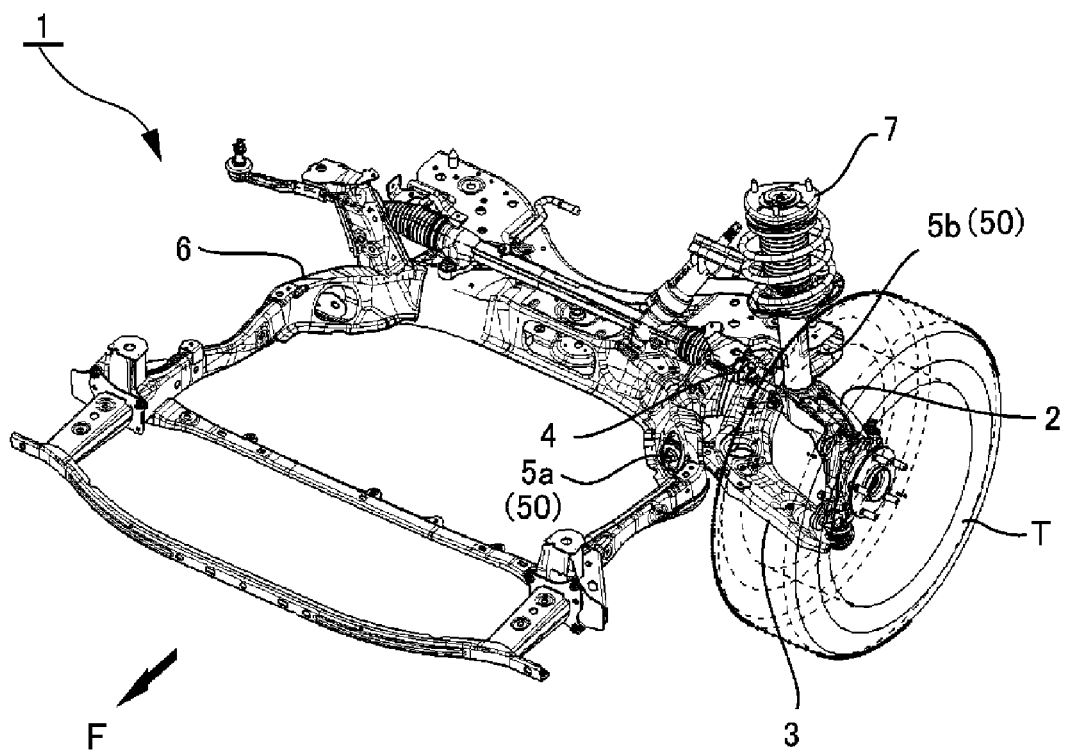
FIG. 1 is a perspective view showing a portion of a suspension of an automobile employing a bushing according to an embodiment of the present disclosure.

Throughout the description of the embodiments, the same elements are denoted by the same reference numerals.

(Suspension)

FIG. 1 shows an example of a front suspension 1 of a motor vehicle.

Here, an example in which a so-called strut type suspension is employed as the front suspension 1 is shown. In addition, the right side of the suspension system in the vehicle running direction F is partially omitted, but has a configuration that is basically symmetrical with that of the left side.

Since the strut type suspension is well known, only its outline will be described. The left front wheel T is rotatably supported by the knuckle 2. The knuckle 2 is supported on the arm 3 so as to be steerable by a tie rod 4 (steering mechanism) which is displaced by rotation of a steering wheel (not shown). The end of the arm 3 facing away from the knuckles 2 is supported on a subframe 6 by two bushings 5a and 5b which are spaced apart from each other in the longitudinal directions of the vehicle. A coil damper 7 is provided between the knuckle 2 and a vehicle body member (not shown) above the knuckle 2.

According to such a configuration, when the front wheel is displaced vertically while the vehicle is running, the swinging motion of the arm 3 about a line segment connecting the two bushings 5a and 5b causes the front wheel T to be displaced along a predetermined trajectory.

Of the two bushings 5a and 5b, the front bushing 5a includes an outer cylinder 60, an inner cylinder 70, and an elastic body 80 provided between the outer cylinder 60 and the inner cylinder 70, as described later. The arrangement direction is such that the axial direction is substantially along the front-rear direction of the vehicle. The inner cylinder 70 is fixed to the subframe 6, and the outer cylinder 60 is fixed to the arm 3.

Of the two bushings 5a and 5b, the rear side bushing 5b includes an outer cylinder 60, an inner cylinder 70, and an elastic body 80 provided therebetween, similarly to the front side bushing 5a. The arrangement direction is different from that of the front bushing 5a, and the axial direction is, for example, the vertical direction. And a hollow portion 5c is provided, which is a space formed in the elastic body 80, so as the arm 3 is configured to be horizontally displaced by the hollow portion 5c more than that by the front bushing 5a.

Figure 2A:
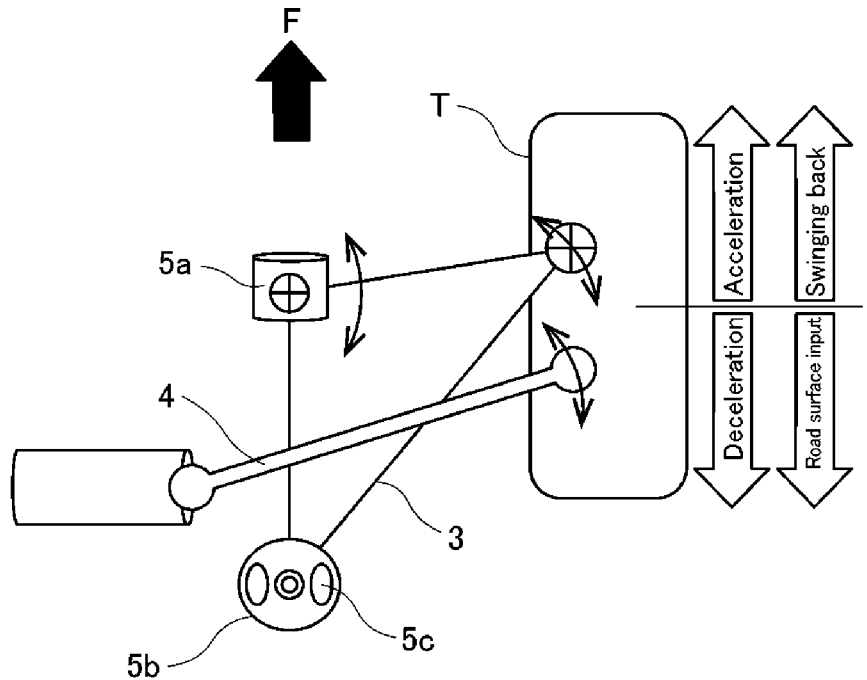
FIG. 2A is a schematic diagram of the suspension behavior during running in a suspension system employing a bushing according to an embodiment of the present disclosure, wherein shows the behavior with respect to the external force in the front-rear direction.
Figure 2B:
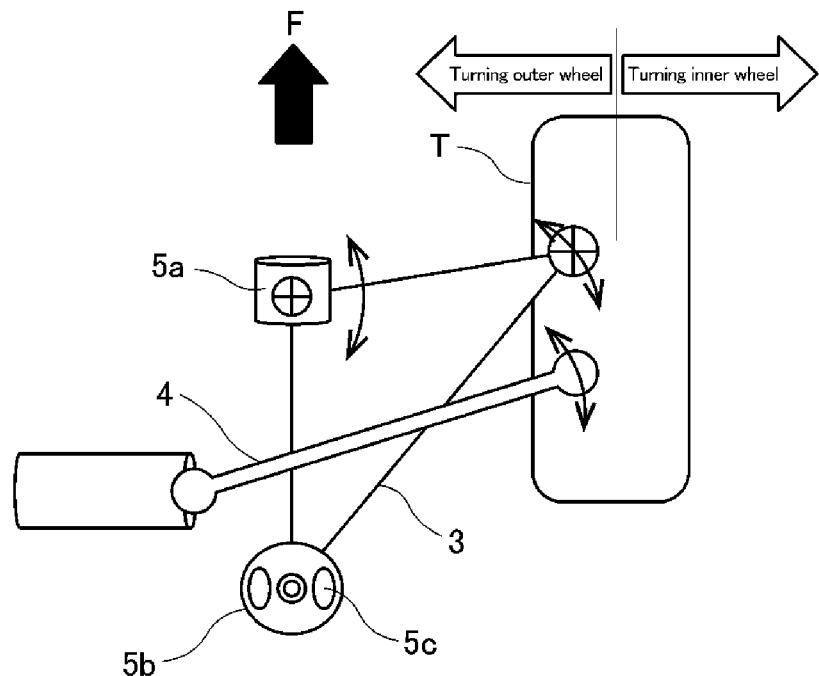
FIG. 2B is a schematic diagram of the suspension behavior during running in a suspension system employing a bushing according to an embodiment of the present disclosure, wherein shows the behavior with respect to the external force in the left-right direction.

FIGS. 2A and 2B shows the positioning function of the suspension. More specifically, FIG. 2A shows the behavior with respect to the external force in the front-rear direction, and FIG. 2B shows the behavior with respect to the external force in the left-right direction. With the configuration and arrangement of the two bushings 5a and 5b as described above, the arm 3 is horizontally displaced by an external force applied to the wheels in various directions when the vehicle is running as shown in FIGS. 2A and 2B. That is, the rotational displacement about the front bushing 5a is mainly the rotational displacement. Therefore, regularity is provided to the behavior of the front suspension 1 while the vehicle is running, and the predictability of the driving for the driver can be improved. Also, due to the behavior above of the suspension device, regularity is provided to the feeling of the drivers response through the steering mechanism and the steering wheel. Therefore, a sense of security and stability can be given to the driver.

(Bushing)

The front bushing 5a positively allows the arm 3 to rotate horizontally, thereby improving the self-contained stopper function. Therefore, when the above-described behavior of the arm 3 is generated, a device for securing durability is required. Hereinafter, the two bushings 5a and 5b will be described with reference to FIGS. 3 to 5. Although the bushing 5a and 5b is collectively described below as the bushing 50, the bushing 50 is not limited to the one used for the above described suspension 1 described above, and is used for a wide variety of suspensions.

Figure 3:
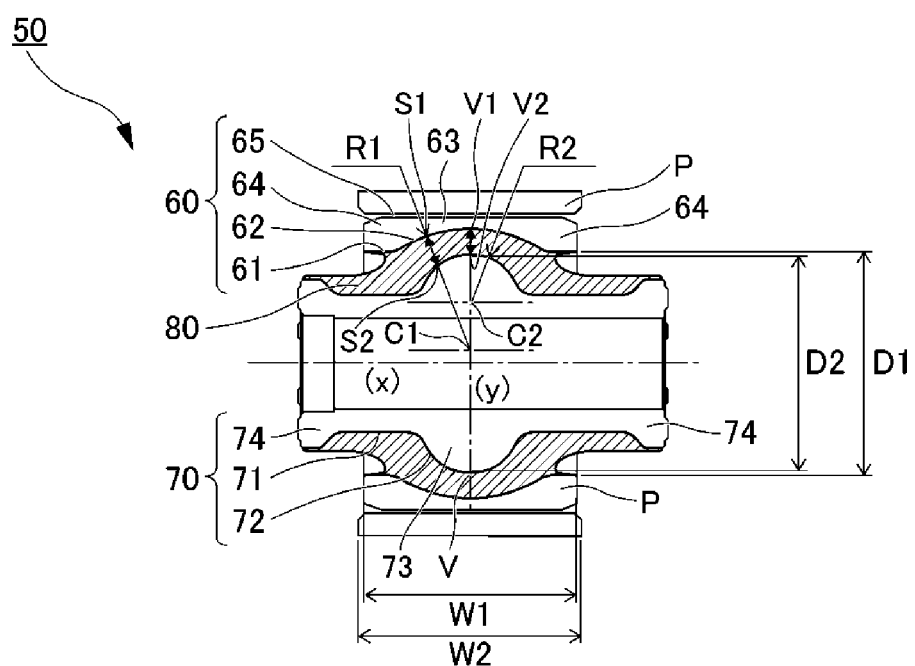
FIG. 3 is a cross-sectional view of a bushing according to an embodiment of the present disclosure taken along the (x) axis direction.

FIG. 3 shows a cross-sectional view of bushing 50. The bushing 50 includes an outer cylinder 60, an inner cylinder 70, and an elastic body 80 provided between the outer cylinder 60 and the inner cylinder 70. FIG. 3 shows an embodiment in which the (x) axial direction center of the inner cylinder 70 and the (x) axial direction center of the outer cylinder 60 are provided not at the same position, that is, positioned offset to either one of the both ends 74 with respect to the center in the (x) axial direction of the inner cylinder 70. However, in the application of the gist of the present embodiment, centers in the (x) axial direction of the outer cylinder 60 and the inner cylinder 70 may be provided at the same position. Among a plurality of modes, a most suitable mode may be selected in accordance with various conditions when the bushing 50 is mounted on a vehicle.

In the following description, the central portion 63 of the outer cylinder 60 means a part of area between both ends 64 of the outer cylinder 60. The central portion 73 of the inner cylinder 70 means a part of area between both ends 74 of the inner cylinder 70. Therefore, the central recess portion 62 of the outer cylinder 60 and the central convex portion 72 of the inner cylinder 70 are described as the central recess portion 62 and the central convex portion 72 respectively, including the case where the central recess portion 62 and the central convex portion 72 are positioned offset to either one of the both ends 74 with respect to the (x) axial center of the inner cylinder 70.

Figure 4:
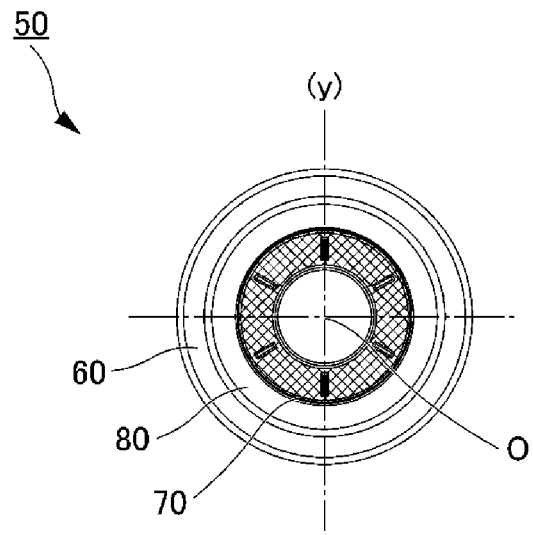
FIG. 4 is a side view of the bushing showing the case where the outer cylinder and the inner cylinder are concentric.
Figure 5:
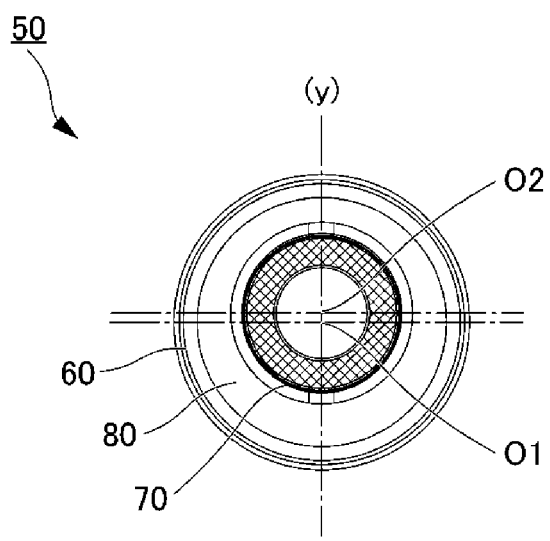
FIG. 5 is a side view of the bushing showing the case where the outer cylinder and the inner cylinder are eccentric in the (y) axis direction.

In FIG. 3, as shown in the side view of FIG. 4, the outer cylinder 60 and the inner cylinder 70 are drawn so as to be concentric (without offset) at the center O. However, as shown in the side view of FIG. 5, the outer cylinder 60 and the inner cylinder 70 may be formed to be eccentric (i.e., offset) to each other in the (y) axial direction, such as the center O1 of the outer cylinder 60 is not positioned just at the center O2 of the inner cylinder 70. Also in this respect, the selection may be made in accordance with various conditions when the bushing 50 is mounted on the automobile. The gist of the present embodiment is applied to any aspect.

Returning to FIG. 3, the bushing 50 will be described in detail. The outer cylinder 60 has a cylindrical inner peripheral surface 61 having a partially constant radius and formed concentrically with the (x) axis of the inner cylinder 70 or eccentrically with respect to the (x) axis of the inner cylinder 70. And the outer cylinder 60 has a central recess portion 62 recessed from the inner peripheral surface 61 in a radial direction (i.e., in a (y) axial direction) orthogonal to the (x) axial direction at a central portion 63 in the (x) axial direction, and the thickness of both ends 64 of the outer cylinder 60 is formed to be thicker than the thickness of the central portion 63. In the outer cylinder 60, a cylindrical outer peripheral surface 65 having a constant radius is positioned at a position corresponding to the central recess 62.

In FIG. 3, the curve of the central recess portion 62 of the outer cylinder 60 exemplifies an arc shape of a radius R1 centered on a first position C1 which deviates from the (x) axis of the inner cylinder 70 in the radial direction (i.e., in the (y) axial direction) in a cross-sectional view along the (x) axial direction. However, in the cross-sectional view along the (x) axial direction, the central recess portion 62 may be formed in a curved shape other than a circular arc shape in surface shape, or in a combination of a curved shape and a straight shape. On the curve of the central recess portion 62 of the outer cylinder 60, the vertex V1 of the inner cylinder 70 farthest from the (x) axis is located.

On the other hand, concerning the inner cylinder 70, a central convex portion 72 which swells (or in other words, "bulges") from the outer peripheral surface 71 in the radial direction (the (y) axial direction) orthogonal to the axial direction is provided at a position corresponding to the central recess portion 62 of the outer cylinder 60, in the central portion 73 of the (x) axial direction. The inner cylinder 70 has both end portions 74 and 74 with the center portion 73 interposed therebetween. FIG. 3 shows a mode in which the outer peripheral surface 71 is enlarged in diameter at both end portions 74, 74, but this is in consideration of the strength of the inner cylinder 70, and as an application of the present embodiment, the outer peripheral surface 71 may be formed straight without being enlarged in diameter.

In FIG. 3, the curve of the central convex portion 72 of the inner cylinder 70 exemplifies the arc shape of the radius R2 centered on the second position C2 different from the first position C1, which is not concentric, similarly to the curve of the central recess portion 62 of the outer cylinder 60. That is, in the cross-sectional view along the (x) axis direction, the curve of the central convex portion 72 of the inner cylinder 70 protrudes in the radial direction (i.e., in the (y) axis direction) from the (x) axis of the inner cylinder 70. However, this portion may also be formed in a curved shape other than a circular arc shape or a shape in which a curve and a straight shape are combined in a cross-sectional view along the (x) axis direction, similarly to the central recess portion 62. On the curve of the central convex portion 72 of the inner cylinder 70, the vertex V2 which is farthest from the (x) axis of the inner cylinder 70 is located.

Here, the maximum outer diameter D2 of the central convex portion 72 of the inner cylinder 70 is formed to be larger than the minimum inner diameter D1 of the inner peripheral surface 61 of the outer cylinder 60. The maximum outer diameter D2 of the central convex portion 72 is the distance between the two points located on the curve of the central recess portion 62 of the outer cylinder 60, i.e., the two vertexes V of the central convex portion 72, which are farthest from the (x) axis of the inner cylinder 70, in the vertical direction in the drawing. The minimum inner diameter D1 of the inner peripheral surface 61 of the outer cylinder 60 is a distance between two points closest to the (x) axis of the inner cylinder 70 on the inner peripheral surface 61 except for the central recess portion 62.

An elastic body 80 is provided between the outer cylinder 60 and the inner cylinder 70. In the elastic body 80, in a cross-sectional view along the axial direction (x) of the inner cylinder 70, a distance between a vertex V1 of the central recess portion 62 and a point V2 at which a perpendicular line ((y) axis) from the vertex V1 of the central recess portion 62 to an axis (x) of the inner cylinder 70 intersects the central convex portion 72 is smaller than a distance between a point S1 other than the vertex V1 of the central recess portion 62 and a point S2 at which a straight line extending from the point S1 other than the vertex V1 of the central recess portion 62 to an intersection point of the perpendicular line ((y) axis) and the axis (x) of the inner cylinder 70 intersects the central convex portion 72.

In this respect, in case the curves of the central recess portion 62 and the central convex portion 72 are formed in an arc shape, they can be positioned as follows. In the elastic body 80, in a cross-sectional view along the axial direction (x) of the inner cylinder 70, a distance between a vertex V1 of the central recess portion 62 and the vertex V2 of the central convex portion 72 is smaller than a distance between a point S1 other than the vertex V1 of the central recess portion 62 and a point S2 at which a straight line extending from a point S1 other than the vertex V1 of the central recess portion 62 to the first position C1 which is the center of the arc of the central recess portion 62 intersects the central convex portion 72.

As described above, by providing the outer cylinder 60 with a difference in wall thickness, the shape can be set to reduce the strain of the elastic body 80 set between the inner cylinder 70 and the outer cylinder 60, and the durability can be improved. For example, the curve consists of the central recess portion 62 and the central convex portion 72 (bulge) described above has an arc shape with a radius R1 and R2 centering on the first position C1 and the second position C2 respectively, which are not concentric with each other. And the radius R2 of the central convex portion 72 is made smaller than the radius R1 of the central recess portion 62. This construction is possible to improve the durability of the elastic body 80 by gradually increasing the wall thickness of the elastic body 80 to the position corresponding to the vertex V2 of the central convex portion 72 where the position of the thinnest of the elastic body 80.

As will be described later, the elastic body 80 is bonded to both the inner peripheral surface 61 of the outer cylinder 60 and the outer peripheral surface 71 of the inner cylinder 70. In case the stopper function is provided between the rubber provided in the flange portion of the outer cylinder and the peripheral component of the bushing as in the conventional inventions, there is a problem of generation of abnormal noise due to stick slip (vibration phenomenon called "chatter") at the time of contact, but the bushing 50 is bonded to both the inner peripheral surface 61 of the outer cylinder 60 and the outer peripheral surface 71 of the inner cylinder 70, therefore it is possible to prevent generation of stick slip by the self-contained stopper function, and thus to prevent generation of abnormal noise.

In order to further enhance the stopper effect, it is desirable that the bushing 50 wraps the outer cylinder 60 on its entire length by making the length W2 of the pressure inlet of the press-fit partner part P (e.g., the arm 3) into which the bushing 50 is press-fitted equal to or longer than the length W1 of the outer cylinder 60 of the bushing 50.

In the bushing 50, a central recess portion 62 is formed in the outer cylinder 60, and the thickness of both end portions 64 is formed to be thicker than the thickness of the central portion 63. This difference in wall thickness increases the strength of the stopper, and even if the input load increases, the originally given function can be maintained.

The structure of bushing 50 described above can be formed by reducing the diameter of the outer cylinder 60 by drawing. The drawing process may be performed either before or after the rubber insert molding (vulcanization molding). However, the details will be described in the next section.

(Drawing Process)

Figure 6:
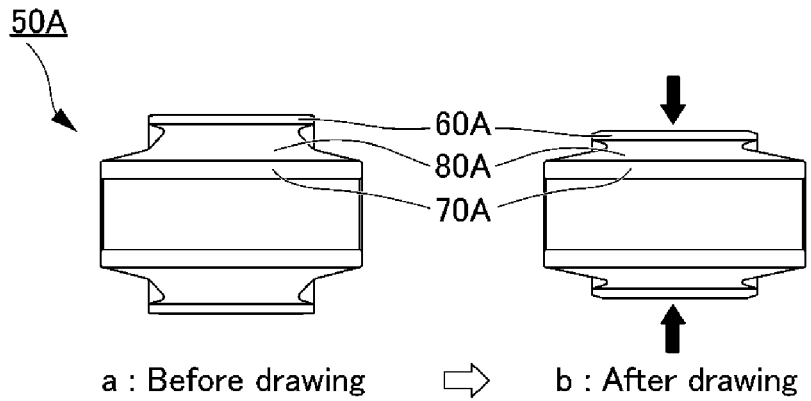
FIG. 6 is a diagram generally illustrating a flow of the drawing process for a bushing.

The drawing process for creation of the wrap structure described above will be described with reference to FIGS. 6 to 8 hereinafter. FIG. 6 is a diagram conceptually illustrating a flow of the drawing process for the bushing 50A, in which the central recess portion 62 of the outer cylinder 60 and the central convex portion 72 of the inner cylinder 70 are not provided, the (x) axial center of the outer cylinder 60 and the (x) axial center of the inner cylinder 70 coincide with each other, and both ends 74, 74 of the inner cylinder 70 are not enlarged in diameter. FIG. 6, as a step (a), shows the outer cylinder 60A, the inner cylinder 70A and the elastic body 80A after the insert molding (vulcanization molding) and before the drawing process of the bushing 50A. And as a step (b) in FIG. 6, shown is a bushing 50A subjected to the drawing process after insert molding. The drawing process, generally, is applied to the outer cylinder 60A in the reduced diameter direction for the purpose of taking the rubber shrinkage of the elastic body 80A and/or of improving its durability.

Figure 7:
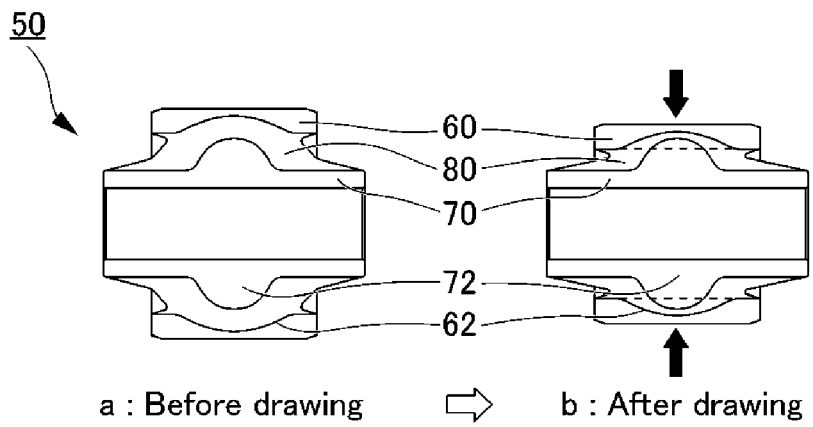
FIG. 7 is a view for explaining a flow of the first kind of drawing method of the bushing.

In the present embodiment, three kinds of drawing methods are possible for manufacturing the bushing 50. The first kind of drawing method will be described with reference to FIG. 7. In the first kind of drawing method, one drawing process is performed after insert molding to form the wrap structure. In FIG. 7, in contrast to FIG. 6, the bushing 50 is illustrated by way of example in a case where the central recess portion 62 of the outer cylinder 60 and the central convex portion 72 of the inner cylinder 70 are provided, and the (x) axial center of the outer cylinder 60 and the (x) axial center of the inner cylinder 70 coincide with each other, and both ends 74 of the inner cylinder 70 are not enlarged in diameter. However, the first kind of drawing method is similarly applied to the bushing 50 of the embodiment shown in FIG. 3 (the same hereinafter).

FIG. 7, as a step (a), shows the bushing 50 before applying drawing process thereon but after insert molding of the outer cylinder 60 and the inner cylinder 70 with the elastic body 80. And as a step (b), shown is the bushing 50 subjected to the drawing after insert molding. The central convex portion 72 of the inner cylinder 70 is wrapped around the central recess portion 62 of the outer cylinder 60 with the elastic body 80 interposed therebetween by the drawing process to reduce the diameter of the outer cylinder 60. It must be noted that in FIG. 7 (see also FIG. 3), as the step (b) after the drawing of the first kind of drawing method is performed, the vertex V2 of the central convex portion 72 of the inner cylinder 70 is separated from the inner peripheral surface 61 of the outer cylinder 60 from the (x) axis (see a broken line). However, the drawing of the first kind of drawing method may be performed in such a manner that the inner peripheral surface 61 of the outer cylinder 60 is separated from the vertex V2 of the central convex portion 72 of the inner cylinder 70 from the (x) axis as in the bushing 50 of the embodiment shown in FIG. 3 (the same hereinafter).

The outer cylinder 60 and the inner cylinder 70 is insert-molded together with the elastic body 80 for obtaining the bushing 50 having a desired shape by using a mold after chemical conversion treatment and adhesive application. Then, after finishing process such as deburring or the like, obtained molded article is subjected to drawing process. The bushing 50 that has passed the inspection is packaged and shipped.

Figure 8:
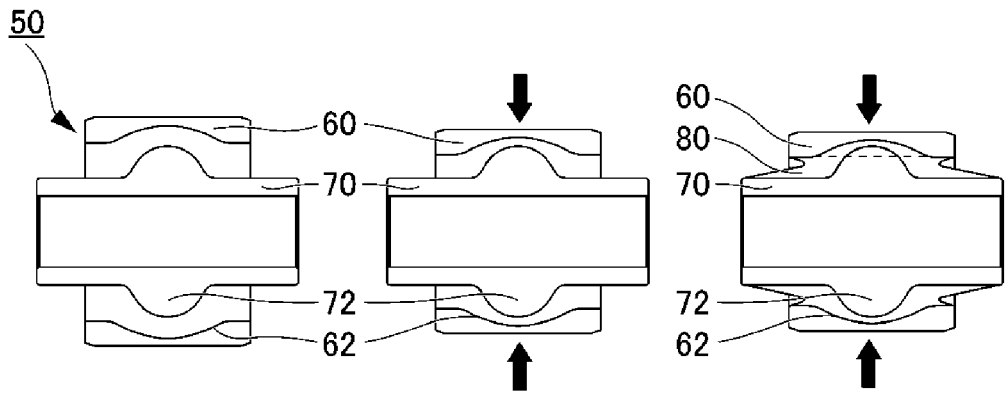
FIG. 8 is a view for explaining a flow of the second and the third kind of drawing methods of the bushing.

The second kind of drawing method will be described with reference to FIG. 8. (FIG. 8 is also used to explain the third kind of drawing method.) In the second kind of drawing method, a primary drawing process is performed before the insert molding, followed by a secondary drawing process which is performed after the insert molding.

FIG. 8, as a step (a), shows the bushing 50 before insert molding of the outer cylinder 60 and the inner cylinder 70 with the elastic body 80, wherein the drawing process is not yet performed thereon. And as a step (b), shown is the bushing 50 after the drawing prior to insert molding. And as a step (c), shown is a bushing 50 being subjected to the drawing after insert molding. The second kind of drawing method corresponds to the steps (a) to (c) in FIG. 8. By the drawing which is performed twice to reduce the diameter of the outer cylinder 60, the central convex portion 72 of the inner cylinder 70 is wrapped in the central recess portion 62 of the outer cylinder 60 with the elastic body 80 interposed therebetween, as in the case of the first kind of drawing method.

In the second kind of drawing method, the primary drawing process is performed after the chemical conversion process and the adhesive application of the outer cylinder 60 and the inner cylinder 70 are completed, but at that time the insert molding is not yet performed thereon together with the elastic body 80. Then, after the primary drawing process is performed, the outer cylinder 60, the inner cylinder 70 and the elastic body 80 are insert molded. Subsequently, a finishing process such as deburring or the like is performed on the obtained molded article. After finishing the finishing process, drawing after insert molding, that is, secondary drawing process is performed. The bushing 50 that has passed the inspection is packaged and shipped.

In the third kind of drawing method, one drawing process for forming the wrap structure such as described above is performed prior to the insert molding. By referring to the steps (a) and (b) in FIG. 8, explanation of the third kind drawing method is omitted.

Figure 9A:
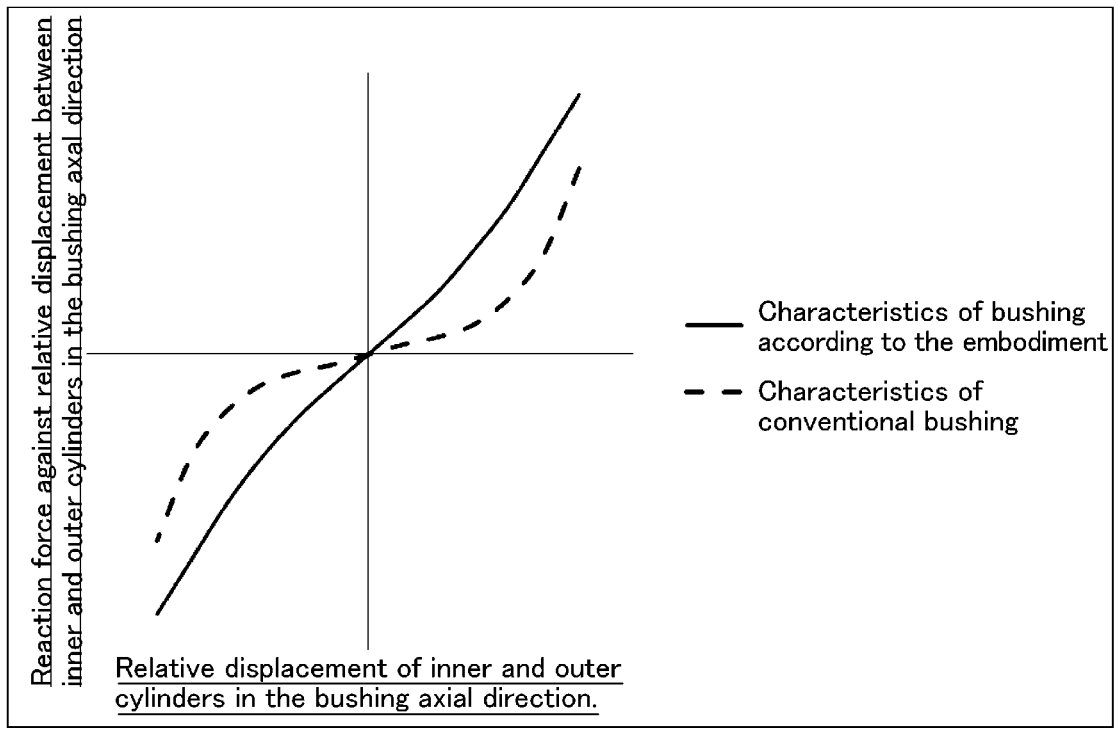
FIG. 9A is a graph showing the characteristics concerning the reaction force of the bushings.
Figure 9B:
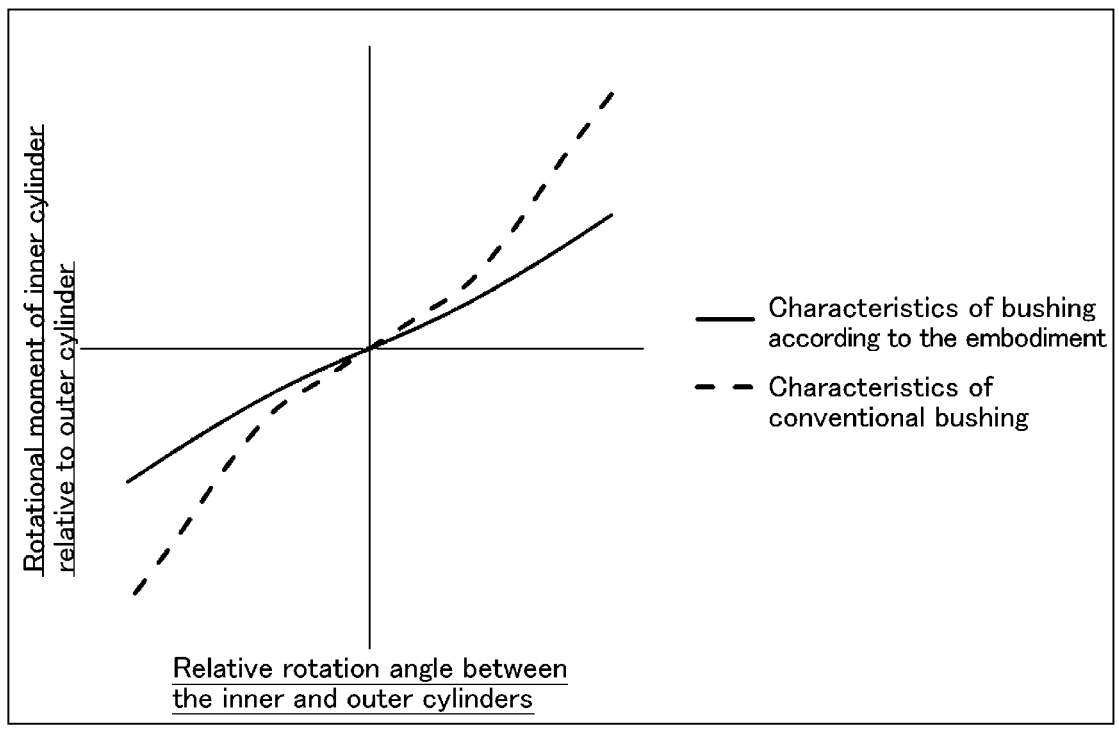
FIG. 9B is a graph showing the characteristics concerning the rotational moment of the bushings.

The characteristics of the bushing 50 configured as described above are shown in FIGS. 9A and 9B. In FIG. 9A, the horizontal axis represents the relative displacement of the inner cylinder 70 and the outer cylinder 60 in the axial direction of the bushing 50, and the vertical axis represents the reaction force with respect to the relative displacement of the inner cylinder 70 and the outer cylinder 60 in the axial direction of the bushing 50. In FIG. 9B, the vertical axis represents the moment of the inner cylinder 70 at the time of relative rotation with respect to the outer cylinder 60, and the horizontal axis represents the relative rotation angle of the inner cylinder 70 with respect to the outer cylinder 60. In the drawing, the solid line represents the characteristic of the bushing 50 according to the present embodiment, and the broken line represents the characteristics of the conventional bushing having no wrap structure.

As can be seen from FIG. 9A, in the bushing 50 according to the present embodiment, the reaction force rises from a region where the relative displacement amount in the axial direction between the inner cylinder 70 and the outer cylinder 60 is smaller than that of the conventional bushing.

And as can be seen from FIG. 9B, compared with the conventional bushing, the bushing 50 according to the present embodiment can obtain a large relative rotation angle even if the relative rotation moment of the inner cylinder 70 with respect to the outer cylinder 60 is small.

The above means the following. First, when the vehicle including the front suspension 1 shown in FIG. 1 runs, in case an external force is applied from the wheel in the axial direction (vehicle front-rear direction) of the bushing 50, the relative displacement of the bushing 50 in the axial direction, and the displacement of the arm 3 in the front-rear direction, is unlikely to occur (self-contained function is high). Second, the relative rotation of the bushing 50 and the rotation behavior of the arm 3 in the horizontal plane are likely to occur. That is, not only the external force in the vehicle width direction but also the external force in the vehicle front-rear direction tend to cause the rotation behavior of the arm 3, and regularity (behavior mainly based on the rotation behavior) is provided to the behavior of the front suspension 1 during the vehicle running, thereby improving the predictability of the driving for the driver.

Although the present disclosure has been described specifically using embodiments above, it is noted that the technical scope of the present disclosure is not limited to the scope described in the above embodiments. And it will be apparent to those skilled in the art that various modifications or improvements can be made to the above-described embodiments. In addition, it is also apparent from the scope of the claims that the embodiments added with such alterations or improvements can be included in the technical scope of the invention.

DESCRIPTION OF THE REFERENCES

1 . . . Front suspension
2 . . . Knuckle
3 . . . Arm
4 . . . Tie-rod
5a . . . Front bushing
5b . . . rear bushing
5c . . . Hollow portion
6 . . . Subframe
7 . . . Coil damper
50 . . . Bushing
60 . . . Outer cylinder
61 . . . Inner peripheral surface (of outer cylinder)
62 . . . Central recess portion (of outer cylinder)
63 . . . Central portion (of outer cylinder)
64 . . . Both ends (of outer cylinder)
65 . . . Outer peripheral surface (of outer cylinder)
70 . . . Inner cylinder
71 . . . Outer peripheral surface (of inner cylinder)
72 . . . Central convex portion (of inner cylinder)
73 . . . Central portion (of inner cylinder)
74 . . . Both ends (of inner cylinder)
80 . . . Elastic body

What is claimed is:
1. A bushing comprising:
an outer cylinder,
an inner cylinder, and
an elastic body provided between the outer cylinder and the inner cylinder,
wherein the outer cylinder has a cylindrical inner peripheral surface having a constant radius formed concentrically or eccentrically with respect to an axis of the inner cylinder, and has a central recess portion recessed from the inner peripheral surface in a radial direction orthogonal to the direction of the axis of the inner cylinder at a central portion along the direction of the axis;
the central recess portion is formed to have a curved shape or a combination of a curved shape and a straight shape in a cross-sectional view along the direction of the axis, wherein a vertex of the central recess portion farthest from the axis of the inner cylinder is located on the curved shape;
the inner cylinder has a central convex portion that swells from an outer peripheral surface thereof in the radial direction orthogonal to the direction of the axis at a position corresponding to the central recess portion at the central portion in the direction of the axis;
the central convex portion is formed to have a curved shape or a combination of a curved shape and a straight shape in the cross-sectional view along the direction of the axis;
a radius of the central convex portion is smaller than a distance between a vertex of the central convex portion and the axis of the inner cylinder; and
in the elastic body, in the cross-sectional view along the direction of the axis of the inner cylinder, a distance between the vertex of the central recess portion and a point at which a perpendicular line from the vertex of the central recess portion to the axis of the inner cylinder intersects the central convex portion is smaller than a distance between a point other than the vertex of the central recess portion and a point at which a straight line extending from the point other than the vertex of the central recess portion to an intersection point of the perpendicular line and the axis of the inner cylinder intersects the central convex portion.

2. A bushing comprising:
an outer cylinder,
an inner cylinder and
an elastic body provided between the outer cylinder and the inner cylinder,
wherein the outer cylinder has a cylindrical inner peripheral surface having a constant radius formed concentrically or eccentrically with respect to an axis of the inner cylinder, and has a central recess portion recessed from the inner peripheral surface in a radial direction orthogonal to the direction of the axis of the inner cylinder at a central portion along the direction of the axis;
the central recess portion is formed to have a curved shape or a combination of a curved shape and a straight shape in a cross-sectional view along the direction of the axis, wherein a vertex of the central recess portion farthest from the axis of the inner cylinder is located on the curved shape;
the inner cylinder has a central convex portion that swells from an outer peripheral surface thereof in the radial direction orthogonal to the direction of the axis at a position corresponding to the central recess portion at the central portion in the direction of the axis;
the central convex portion is formed to have a curved shape or a combination of a curved shape and a straight shape in the cross-sectional view along the direction of the axis;
the curved shape of the central recess portion is formed by an arc of a circle centered on a first position that deviates from the axis of the inner cylinder in the radial direction in the cross-sectional view along the direction of the axis of the inner cylinder;

the curved shape of the central convex portion is formed by an arc of a circle centered on a second position that is different from the first position and deviates from the axis of the inner cylinder in the radial direction in the cross-sectional view along the direction of the axis of the inner cylinder;

the first position and the second position radially deviate to a side of the arcs with respect to the axis of the inner cylinder; and in the elastic body, in the cross-sectional view along the direction of the axis of the inner cylinder, a distance between the vertex of the central recess portion and a vertex of the central convex portion is smaller than a distance between a point other than the vertex of the central recess portion and a point at which a straight line extending from the point other than the vertex of the central recess portion to the first position which is the center of the arc of the central recess portion intersects the central convex portion.

3. The bushing of claim 2, wherein a radius of the arc of the central convex portion is smaller than a radius of the arc of the central recess portion.

4. The bushing according to claim 1, wherein the outer cylinder has a cylindrical outer peripheral surface with a constant radius at a position corresponding to the central recess portion.

5. The bushing according to claim 2, wherein the outer cylinder has a cylindrical outer peripheral surface with a constant radius at a position corresponding to the central recess portion.

6. The bushing according to claim 3, wherein the outer cylinder has a cylindrical outer peripheral surface with a constant radius at a position corresponding to the central recess portion.

7. The bushing according to claim 1, wherein a thickness of both ends of the outer cylinder is greater than a thickness of the central portion thereof.

8. The bushing according to claim 2, wherein a thickness of both ends of the outer cylinder is greater than a thickness of the central portion thereof.

9. The bushing according to claim 3, wherein a thickness of both ends of the outer cylinder is greater than a thickness of the central portion thereof.

10. The bushing according to claim 1, wherein a maximum outer diameter of the central convex portion is larger than a minimum inner diameter of the inner peripheral surface of the outer cylinder.

11. The bushing according to claim 2, wherein a maximum outer diameter of the central convex portion is larger than a minimum inner diameter of the inner peripheral surface of the outer cylinder.

12. The bushing according to claim 3, wherein a maximum outer diameter of the central convex portion is larger than a minimum inner diameter of the inner peripheral surface of the outer cylinder.

13. A vehicle suspension device, comprising:

an arm member provided between a knuckle for rotatably supporting a wheel and a vehicle body for vertically displaceably positioning the wheel, and two bushings for swingably supporting the arm member with respect to the vehicle body and disposed apart from each other in the vehicle front-rear direction, wherein one bushing of the two bushings includes an outer cylinder fixed to one of the vehicle body or the arm member, an inner cylinder fixed to the other of the vehicle body or the arm member, and an elastic body provided between the outer cylinder and the inner cylinder;

the outer cylinder has a cylindrical inner peripheral surface having a constant radius formed concentrically or eccentrically with respect to an axis of the inner cylinder, and has a central recess portion recessed from the inner peripheral surface in a radial direction orthogonal to the direction of the axis of the inner cylinder at a central portion in the direction of the axis;

in a cross-sectional view along the direction of the axis, the central recess portion is formed to have a curved shape or a combination of a curved shape and a straight shape, and a vertex of the central recess portion farthest from the axis of the inner cylinder is located on the curved shape;

the inner cylinder has a central convex portion which swells from an outer peripheral surface thereof in the radial direction orthogonal to the direction of the axis at a position corresponding to the central recess portion at the central portion in the direction of the axis;

in the cross-sectional view along the direction of the axis, the central convex portion is formed in a curved shape or a combination of a curved shape and a straight shape;

a radius of the central convex portion is smaller than a distance between a vertex of the central convex portion and the axis of the inner cylinder;

in the elastic body, in the cross-sectional view along the direction of the axis of the inner cylinder, a distance between the vertex of the central recess portion and a point at which a perpendicular line from the vertex of the central recess portion to the axis of the inner cylinder intersects the central convex portion is smaller than a distance between a point other than the vertex of the central recess portion and a point at which a straight line extending from the point other than the vertex of the central recess portion to an intersection point of the perpendicular line and the axis of the inner cylinder intersects the central convex portion; and the other bushing of the two bushings is configured to allow rotation of the arm member about the one bushing caused by an external force applied to the wheel when the vehicle is running.

14. A vehicle suspension device, comprising:

an arm member provided between a knuckle for rotatably supporting a wheel and a vehicle body for vertically displaceably positioning the wheel, and two bushings for swingably supporting the arm member with respect to the vehicle body and disposed apart from each other in the vehicle front-rear direction, wherein one bushing of the two bushings includes an outer cylinder fixed to one of the vehicle body or the arm member, an inner cylinder fixed to the other of the vehicle body or the arm member, and an elastic body provided between the outer cylinder and the inner cylinder;

the outer cylinder has a cylindrical inner peripheral surface having a constant radius formed concentrically or eccentrically with respect to an axis of the inner cylinder, and has a central recess portion recessed from the inner peripheral surface in a radial direction orthogonal to the direction of the axis of the inner cylinder at a central portion in the direction of the axis;

in a cross-sectional view along the direction of the axis, the central recess portion is formed to have a curved shape or a combination of a curved shape and a straight shape, and a vertex of the central recess portion farthest from the axis of the inner cylinder is located on the curved shape;

the inner cylinder has a central convex portion which swells from an outer peripheral surface thereof in the radial direction orthogonal to the direction of the axis at a position corresponding to the central recess portion at the central portion in the direction of the axis;

in the cross-sectional view along the direction of the axis, the central convex portion is formed in a curved shape or a combination of a curved shape and a straight shape;

the curved shape of the central recess portion is formed by an arc of a circle centered on a first position that deviates from the axis of the inner cylinder in the radial direction in the cross-sectional view along the direction of the axis of the inner cylinder;

the curved shape of the central convex portion is formed by an arc of a circle centered on a second position that is different from the first position and deviates from the axis of the inner cylinder in the radial direction in the cross-sectional view along the direction of the axis of the inner cylinder;

the first position and the second position radially deviate to a side of the arcs with respect to the axis of the inner cylinder;

in the elastic body, in the cross-sectional view along the direction of the axis of the inner cylinder, a distance between the vertex of the central recess portion and a vertex of the central convex portion is smaller than a distance between a point other than the vertex of the central recess portion and a point at which a straight line extending from the point other than the vertex of the central recess portion to the first position which is the center of the arc of the central recess portion intersects the central convex portion; and the other bushing of the two bushings is configured to allow rotation of the arm member about the one bushing caused by an external force applied to the wheel when the vehicle is running.

* * * * *